United States Patent [19]

Pockat et al.

[11] Patent Number: 5,023,121
[45] Date of Patent: Jun. 11, 1991

[54] COEXTRUDED FILM WITH PEELABLE SEALANT

[75] Inventors: Gregory R. Pockat, Simpsonville; Carl C. Christenberry, Greenville; Paul J. Satterwhite, Simpsonville, all of S.C.

[73] Assignee: W. R. Grace & Co.-Conn., Duncan, S.C.

[21] Appl. No.: 509,688

[22] Filed: Apr. 12, 1990

[51] Int. Cl.$^5$ .............................................. B32B 27/08
[52] U.S. Cl. .................................. 428/36.9; 428/35.4; 428/349; 428/474.4; 428/475.8; 428/476.3; 428/516; 426/127; 206/484; 156/272.2
[58] Field of Search ............... 428/35.4, 349, 516, 428/474.4, 475.5, 475.8, 476.3, 36.7; 156/272; 426/127; 206/484

[56] References Cited

U.S. PATENT DOCUMENTS

| | | | |
|---|---|---|---|
| 3,496,061 | 2/1970 | Freshour | 161/254 |
| 3,634,551 | 1/1972 | Stancell | 260/897 |
| 3,655,503 | 4/1972 | Stanley et al. | 161/165 |
| 3,808,304 | 4/1974 | Schirmer | 264/289 |
| 3,817,821 | 6/1974 | Gallini | 161/165 |
| 4,075,290 | 2/1978 | Denzel et al. | 260/897 |
| 4,178,401 | 12/1979 | Weinberg et al. | 428/35 |
| 4,189,519 | 2/1980 | Ticknor | 428/476 |
| 4,207,363 | 6/1980 | Lustig et al. | 428/35 |
| 4,316,970 | 2/1982 | Hughes | 525/240 |
| 4,354,004 | 10/1982 | Hughes et al. | 525/240 |
| 4,382,513 | 5/1983 | Schirmer et al. | 206/484 |
| 4,615,926 | 10/1986 | Hsu et al. | 428/35 |
| 4,638,913 | 1/1987 | Howe, Jr. | 206/632 |
| 4,656,068 | 4/1987 | Raines | 428/35 |
| 4,665,130 | 5/1987 | Hwo | 525/222 |
| 4,666,778 | 5/1987 | Hwo | 428/412 |
| 4,680,340 | 7/1987 | Oreglia et al. | 525/72 |
| 4,720,420 | 6/1988 | Crass et al. | 428/216 |
| 4,729,476 | 3/1988 | Lulham et al. | 206/484 |
| 4,735,855 | 4/1988 | Wofford et al. | 428/349 |
| 4,756,421 | 7/1988 | Meek | 206/524.2 |
| 4,766,018 | 8/1988 | Hinrichsen et al. | 428/35 |
| 4,808,662 | 2/1989 | Hwo | 525/074 |

OTHER PUBLICATIONS

*Polybutylene Blends as Easy Open Seal Coats for Flexible Packaging and Lidding*, by Charles C. Hwo, Presented at 1987 TAPPI Polymers, Laminations and Coatings Conference at San Francisco, Calif., Sep. 9-11, 1987.

Primary Examiner—Edith Buffalow
Attorney, Agent, or Firm—John J. Toney; William D. Lee, Jr.; Leigh P. Gregory

[57] ABSTRACT

An easily opened package is made by heat sealing a first web to a second web. The sealing layer of the first web is a blend of polybutene and polypropylene with a third polymeric material of ethylene vinyl acetate copolymer. Low density polyethylene, linear low density polyethylene, or ionomer. The sealant layer of the second web is ethylene vinyl acetate copolymer, low density polyethylene, linear low density polyethylene or ionomer.

4 Claims, 2 Drawing Sheets

COEXTRUDED FILM WITH PEELABLE SEALANT

This is a divisional application of application Ser. No. 247,198, filed on Sept. 21, 1988.

BACKGROUND OF THE INVENTION

This invention relates generally to packaging and specifically to packaging laminates for food products.

It is common practice to package articles such as food products in thermoplastic films or laminates to protect the product to be packaged from abuse and exterior contamination, and to provide a convenient and durable package for transportation and sale to the end user.

Typical thermoplastic packaging films and laminates which provide the desired abuse protection and other desirable features in the finished package also tend to form strong heat seals when sealed together about the product. These materials, after heat sealing, are often difficult to open by the consumer or end user. It has therefore been desirable to have a packaging material which provides adequate protection of the product against environmental contaminants, moisture and air, and sufficiently strong heat seals to maintain the integrity of the package through the distribution channels and storage, and at the same time provide a heat seal which is easily opened i.e. easily peelable by the consumer or end user. Such an easy open feature avoids the need to tear apart the package with knife or other implements when it is desired to use the product.

It is also desirable to provide packaging materials with the above benefits and which in addition have bonding capabilities, so that upon packaging a product such as a food product, for example in a thermoforming process, an upper and lower laminate will bond in contiguous areas around and up to the product, providing a sufficiently strong bond between the laminates to maintain the integrity of the package and protection of the packaged product through the distribution cycle.

Another feature of a packaging system, which would be of great benefit to the food packaging industry, is the capability of providing approximately the same ease of openability under a wide range of sealing conditions. Currently, most easy-open systems will exhibit an easily peelable seal when an article is placed in the thermoformed web in a particular way. However, with variations in product placement and size, the bonded area of the final package can become greater. This in turn means that more work must be accomplished to open a particular package if the peel force remains the same. Ideally, an easy-open feature will permit packages to be opened with a sufficiently low, opening force to permit easy opening of the package regardless of product placement.

Of interest is U.S. Pat. No. 3,655,503 which issued to Hugh E. Stanley et al on Apr. 11, 1972. This reference shows a package of a composite, heat sealable thermoplastic film having an outer and inner layer with a relatively low interlayer bond strength. This film is used by overwrapping about the article to be packaged; the film is then heat-sealed to itself at overlapping seams. Ionomers are suitable resins for the outer layer and inner layer. The ionomer when used as an inner layer is used in conjunction with polypropylene. The present invention, in contrast, uses two distinct webs to package an article by thermoforming or other suitable means. The Stanley patent teaches an easily opened heat seal in which the heat seal zone comprising bonded outer layers of the overlapped film is first ruptured during opening, and then delamination starts along the interface between an outer and inner layer. At the end of the heat seal zone, the outer layer is once again ruptured to complete the peeling of the package. Rupturing and delamination may occur more than once throughout the heat seal zone during opening. The reference shows only a single resin used in the outer or an inner layer.

Also of interest is U.S. Pat. No. 4,178,401 issued to Alan S. Weinberg et al. This reference discloses a self-welding packaging film in which the inner or self-welding layer is a blend of ethylene vinyl acetate copolymers with differing melt flow indices. Blends of ionomer of low melt flow with ethylene vinyl acetate copolymers with high melt flow are also disclosed, but these latter blends show poor self-weldability. An easily peelable heat seal is not shown.

Also of interest is U.S. Pat. No. 4,382,513 issued to Henry G. Schirmer et al on May 10, 1983. This patent discloses a package having a peelable heat seal wherein unoriented films are irradiated to control the bond strength of the resulting heat seal. Ionomers of ethylene and ethylene vinyl acetate copolymer are possible sealing layers of thermoplastic films used with this irradiated process.

Also of interest are two patents assigned to Shell Oil Company. The first patent, U.S. Pat. No. 4,665,130 issued to Hwo discloses a packaging film capable of forming peelable seals, the peelable seal being capable of opening in the original plane of joining between sealant layers without wrenching off or tearing occurring in the material. The sealant comprises a mixture of ethylenic polymer or copolymer, butene-1 polymer or copolymer, and polypropylene polymer or copolymer. U.S. Pat. No. 4,666,778 also issued to Hwo discloses a packaging film capable of forming peelable seals, similar to that described in the '130 patent.

U.S. Pat. No. 4,735,855 issued to Wofford et al discloses a thermoformable laminate having a core layer of EVOH, intermediate nylon layers, an outer layer of e.g. polypropylene, a sealant layer of ionomer, polyolefin, ethylene alpha-olefin copolymer, or blends thereof, and adhesive layers between the nylon layers and the outer and sealant layers respectively.

It is an object of the present invention to provide a package which is made from materials including sealing layers of incompatible materials, thereby providing an easily opened seal.

It is a further object of the present invention to provide a package for food products which includes a first web and a second web which bond to each other along their contiguous surfaces during a thermoforming process.

It is a further object of the present invention to provide a package for food products which has good bonding characteristics and good seal strength, yet is easily peelable through both the bonded areas and fusion seal areas of the package.

It is also an object of the present invention to provide a heatsealed package which can be easily opened with a relatively consistent, low seal opening force, over a relatively wide range of sealing conditions.

SUMMARY OF THE INVENTION

The present invention relates to an easily opened package comprising a first web including a sealant layer comprising a blend of polybutene and polypropylene and a third polymeric material selected from the group consisting of ethylene vinyl acetate copolymer, low density polyethylene, linear low density polyethylene, and ionomer; a second web including a sealant layer comprising a polymeric material selected from the group consisting of ethylene vinyl acetate copolymer, low density polyethylene, linear low density polyethylene and an ionomer; the first and second webs being heat-sealed to each other and enclosing an article.

In another aspect, the subject invention is a process for producing an easily opened package comprising forming a first web having a sealant layer comprising a blend of polybutene and polypropylene, and a third polymeric material selected from the group consisting of ethylene vinyl acetate copolymer, low density polyethylene, linear low density polyethylene and ionomer; placing an article on the first formed web; disposing a second web, having a sealant layer comprising a polymeric material, over the product to form an enclosure the third polymeric material selected from the group consisting of ethylene vinyl acetate copolymer, low density polyethylene, linear low density polyethylene, and ionomer, over the product to form an enclosure; heating the second web; vacuumizing the enclosure; heat sealing the first and second webs at or near the periphery of the package; and causing the heated web to tack to the first web so as to enclose the article between the webs and bond the first and second webs to form a package.

BRIEF DESCRIPTION OF THE DRAWINGS

In the drawings which are attached hereto and made a part of this disclosure.

DEFINITIONS

Figure 1:
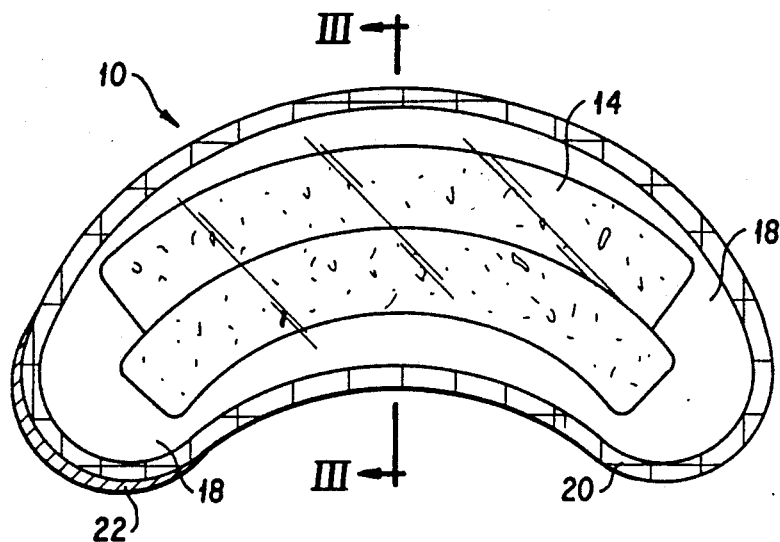
FIG. 1 is a plan view of a package which may be made in accordance with the present invention.
Figure 2:
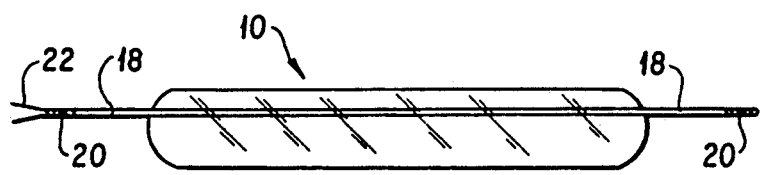
FIG. 2 is a side view of a package made in accordance with the invention.
Figure 3:
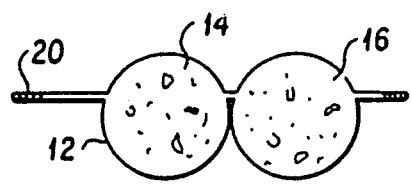
FIG. 3 is a cross-sectional view taken along line III—III of FIG. 1.

"Easily opened" and like terminology is used herein to refer to a package, and specifically heat-sealed and bonded areas of a package, which are readily peelable without totally tearing or rupturing the packaging materials which may result in premature destruction of the package and inadvertent contamination of the contents of the package. An easily opened package is one which can be peeled without resort to a knife or other implement to tear open the package.

"Bonding" and like terminology is used herein to refer to materials which adhere to each other in a contact seal and will stay bonded through normal commercial distribution without external force. This adherent or contact bond is maintained by the strength of the bond alone and is not due to any extraneous force pushing the film sheets or package walls together, other than atmospheric pressure. "Bonding" herein is therefore not used in its usual sense of interlaminar or interlayer adhesion in a multilayer polymeric structure.

"Perimeter seal" and like terminology is used herein to denote a seal around the peripheral area of the package, made under heat and mechanical pressure and for a sufficient duration of time to fuse the sealing surfaces of the respective webs.

"Ionomer" is used herein to refer to metal salts of ethyleneacrylic or methacrylic acid copolymers having pendent carboxylate groups associated with monovalent or divalent cations such as zinc or sodium.

DETAILED DESCRIPTION OF THE PREFERRED EMBODIMENTS

Referring to the drawings, package 10 has a first web 12 which is a forming web produced by thermoforming or other suitable techniques well known in the art. Suitable thermoforming methods, for example, include a vacuum forming or plug-assist vacuum forming method. In a vacuum forming method, the first web is heated e.g. by a contact heater or infrared method and a vacuum is applied beneath the web causing the web to be pushed by atmospheric pressure down into a preformed mold. Alternatively, after heating the first web, air pressure is applied above the web to push the web down into a preformed mold by applied pressure In a plug-assist vacuum forming method, after the first or forming web has been heated and sealed across a mold cavity, a plug shape similar to the mold shape impinges on the forming web and, upon the application of vacuum, the forming web transfers to the mold surface.

After the forming web is in place, a food product 14 such as link sausage is placed, such as by manual loading, on the forming web and a second, substantially non-forming web 16 is disposed over the product and heated by a heating plate. The chamber containing the first and second webs is vacuumized, thereby vacuumizing the enclosure formed by the first and second webs. A perimeter seal is applied within the chamber by a descending seal platen. A release of vacuum causes the forming web to press against and bond to the non-forming web so as to enclose the product between the webs and create a bonded area 18 of the first and second webs at their contiguous surfaces. The first or forming web encloses a substantial portion, generally more than half, of the product to be packaged.

The first and second webs are preferably made from a shrinkable material i.e. a material which has been oriented such as by stretch orienting and which will shrink about the product upon elevating the temperature of the film or laminate. Thus, the package may be treated by a brief exposure to heat, in the form of hot air or hot water or steam, to shrink the formed laminate around the product to achieve a tight and wrinkle-free package, and also to insure that the sealing surfaces i.e. the bonded areas 18 in contact with each other adhere firmly to achieve excellent clarity and resistance to loss of package vacuum in the event that a packaging material is punctured.

A first or forming web made from unoriented material in accordance with the preferred embodiment of this invention will still exhibit some shrinkage about the product to be packaged after thermoforming and exposure to hot air or hot water. This shrinkage results from orienting of the material that occurs in the forming station.

Before the first and second webs have been bonded and preferably before the shrinking operation described above is performed, the peripheral edge of the package is sealed such as by a heated platen using techniques well known in the art. This perimeter seal 20 is located at or near the actual periphery of the package. In a preferred embodiment, a portion of the peripheral area around the package is extended, forming an external flap 22 providing a means for easily opening the package. The contiguous surfaces of the first web 12 and second web 16 are not completely sealed in the region of this external flap, thereby facilitating the use of the easy-open mechanism in accordance with the invention by including a convenient means for pulling apart the package.

The laminate of the first or forming web 12 includes a sealant layer 26 (see FIG. 4) comprising a blend of polybutene and polypropylene blended with a third polymeric material such as ethylene vinyl acetate copolymer, low density polyethylene, linear low density polyethylene, or ionomer. The ethylene vinyl acetate copolymer contains preferably between about 6% and 20% vinyl acetate by weight. The ionomer is preferably a zinc ionomer, such as Surlyn 1705 available from du Pont Company, but may be a sodium ionomer as well.

The laminate forming the second, substantially non-forming web 16 likewise includes a sealant layer 24 of ethylene vinyl acetate copolymer, low density polyethylene, linear low density polyethylene, or ionomer. The sealant layer preferably has a thickness of between about 0.2 and 0.5 mils, and most preferably about 0.3 mils. EVA resins having between about 6% and 20% vinyl acetate by weight are preferred. A suitable resin is Elvax 3134, an EVA with 9% vinyl acetate by weight, and commercially available from du Pont.

The polybutene/polypropylene blend of sealant layer 26 is commercially available from Shell Oil Company as Shell 1560, and comprises a melt blend of 80% PB with 20% PP.

Of course, the polybutene, polypropylene, and third polymeric material of sealing layer 26 may be separately provided as independent resins which are blended at substantially the same time prior to coextrusion.

As the third polymeric material of the blend in the sealant layer, various EVA, LDPE, LLDPE, and ionomer resins commercially available in the art are suitable for use in connection with the present invention. For example, a suitable EVA is Elvax 3130SB, an EVA with 12% vinyl acetate by weight, a density of 0.940 grams per cubic centimeter, and a melt index of between 2 and 3 grams per ten minutes. This material is available from du Pont. A suitable low density polyethylene is PE-109CS098 available from El Paso. A suitable linear low density polyethylene is Dowlex 2044A available from Dow Chemical. Various ionomers are available from du Pont under the trademark Surlyn. These include both zinc and sodium ionomers.

The three-component blend of the sealant layer 26 preferably comprises a minor portion of PB and PP, with a relatively greater proportion of the third polymeric material.

More preferably, the blend comprises between about 8% and 50% of the polybutene and polypropylene blend and between about 50% and 92% of the third polymeric material.

If the polybutene and polypropylene are introduced separately as discrete resin materials and blended together with the third polymeric material, the blend preferably comprises between about 6% and 40% polybutene, between about 2% and 10% polypropylene, and between about 50% and 92% of the third polymeric material.

All of the above percentages are by weight. Those skilled in the art will recognize that these percentages may vary slightly as a result of inclusion or application of additives to the sealant layer.

For example, in the preferred embodiment, about 0.2% anti-block agent is added to the blend, at the expense of the third polymeric material, i.e. reducing that material by a like amount. A preferred anti-block agent is a diatomaceous silica, $SiO_2$, which is available from McCullough & Benton, Inc. under the tradename Superfine Superfloss. Antiblock is advantageously used as a processing aid.

The invention may be further understood by reference to the examples which follow.

TABLE 1

| Example | Structure | | | | | | |
|---|---|---|---|---|---|---|---|
| 1 | 92% $EVA_1$/ 8% PB/PP/ 25.0 | $ADH_1$/ 10.0 | $Nylon_1$/ 13.5 | $EVOH_1$/ 10.0 | $Nylon_1$/ 12.5 | $ADH_2$/ 10.0 | $PP_1$ 19.0 |
| 2 | 86% $EVA_1$/ 14% PB/PP/ 25.0 | $ADH_1$/ 10.0 | $Nylon_1$/ 13.5 | $EVOH_1$/ 10.0 | $Nylon_1$/ 12.5 | $ADH_2$/ 10.0 | $PP_1$ 19.0 |
| 3 | 78% $EVA_1$/ 22% PB/PP/ 25.0 | $ADH_1$/ 10.0 | $Nylon_1$/ 13.5 | $EVOH_1$/ 10.0 | $Nylon_1$/ 12.5 | $ADH_2$/ 10.0 | $PP_1$ 19.0 |
| 4 | 78% $EVA_1$/ 22% PB/PP/ 25.0 | $ADH_3$/ 10.0 | $Nylon_1$/ 13.5 | $EVOH_1$/ 10.0 | $Nylon_1$/ 12.5 | $ADH_2$/ 10.0 | $PP_1$ 19.0 |
| 5 | 92% LDPE/ 8% PB/PP/ 25.0 | $ADH_3$/ 10.0 | $Nylon_1$/ 13.5 | $EVOH_1$/ 10.0 | $Nylon_1$/ 12.5 | $ADH_2$/ 10.0 | $PP_1$ 19.0 |
| 6 | 86% LDPE/ 14% PB/PP/ 25.0 | $ADH_3$/ 10.0 | $Nylon_1$/ 13.5 | $EVOH_1$/ 10.0 | $Nylon_1$/ 12.5 | $ADH_2$/ 10.0 | $PP_1$ 19.0 |
| 7 | 78% LDPE/ 22% PB/PP/ 25.0 | $ADH_3$/ 10.0 | $Nylon_1$/ 13.5 | $EVOH_1$/ 10.0 | $Nylon_1$/ 12.5 | $ADH_2$/ 10.0 | $PP_1$ 19.0 |
| 8 | 92% $LLDPE_1$/ 8% PB/PP 25.0 | $ADH_4$/ 10.0 | $Nylon_1$/ 13.5 | $EVOH_1$/ 10.0 | $Nylon_1$/ 12.5 | $ADH_2$/ 10.0 | $PP_1$ 19.0 |
| 9 | 86% $LLDPE_1$/ 14% PB/PP/ 25.0 | $ADH_4$/ 10.0 | $NYLON_1$/ 13.5 | $EVOH_1$/ 10.0 | $NYLON_1$/ 12.5 | $ADH_2$/ 10.0 | $PP_1$ 19.0 |
| 10 | 78% $LLDPE_1$/ 14% PB/PP/ 25.0 | $ADH_4$/ 10.0 | $Nylon_1$/ 13.5 | $EVOH_1$/ 10.0 | $Nylon_1$/ 12.5 | $ADH_2$/ 10.0 | $PP_1$ 19.0 |

Examples 1 through 10 were forming webs produced by coextrusion techniques in which a melt stream of the various resins listed was coextruded together and the extrudate was quenched in a cold water bath and then drawn onto a take up roll. In each case, the final overall film gauge was about 4.5 mils. The thickness of each layer is indicated under each resin as a percentage of the overall thickness of the structure. As an example, the blend sealant layer has the indication 25.0, indicating that this sealant layer comprised about 25% of the overall film thickness.

In the legend which follows, each commercial resin used to make the films of Examples 1 through 10 is identified.

| LEGEND | | |
|---|---|---|
| $EVA_1 =$ | ELAX 3130SB (12% VA) | (du Pont) |
| PB/PP = | Shell PB 1560 | (Shell Oil Company) |
| $PP_1 =$ | NPP 2085 GW | (Quantum) |
| $Nylon_1 =$ | Ultramid 602U (Nylon 6) | (BASF) |
| $EVOH_1 =$ | EVAL EC-F101 | (EVAL Co. of America) |
| $LLDPE_1 =$ | Dowlex 2044 | (Dow) |
| $Adhesive_1 =$ | Bynel 3062 (EVA) | (du Pont) |
| $Adhesive_2 =$ | Bynel 3095 (EVA) | (du Pont) |
| $Adhesive_3 =$ | NF500 (LLDPE) | (Mitsui) |
| $Ahesive_4 =$ | Bynel E325 (LLDPE) | (du Pont) |
| LDPE = | PE-109CS 098 | (El Paso) |

EXAMPLE 11

Another structure like that of Example 1 has the same construction with the same relative thicknesses of each layer. The difference is that instead of the EVA of the sealant blend layer, an ionomer such as a Surlyn available from du Pont is included.

EXAMPLE 12

A structure like that of Example 2 is produced, but having 86% ionomer instead of 86% EVA in the sealant blend layer.

EXAMPLE 13

A structure like that of Example 3 is produced, but having 78% ionomer instead of 78% EVA in the sealant blend layer.

EXAMPLES 14-17

Structures like those previously disclosed in Examples 1 through 13 are produced, in which the EVA, LDPE, LLDPE, of ionomer or the sealant blend layer comprises about 75% of the sealant layer. The remainder, about 25% by weight, is the polybutene/polypropylene blend.

EXAMPLES 18-21

A construction like that of the previous examples is produced, in which the EVA, LDPE, LLDPE, or ionomer of the sealant blend layer comprises about 50% of the sealant layer, the remainder comprising the polybutene/polypropylene blend.

Various non-forming webs may be used in conjunction with the forming web in accordance with the present invention. These non-forming webs are current commercial structures well known in the art, and typically comprise an outer layer of a biaxially oriented nylon, a print layer bonded to the outside layer, and one or more polyolefinic layers, such as an EVA layer bonded by an intermediate adhesive to the print layer. A sealant layer comprising an EVA, LDPE, LLDPE or ionomer may be adhered to the polyolefinic layer, or the polyolefinic layer itself may function as a sealant layer. In either case, it has been found that EVA, LDPE, and LLDPE sealant layers of the non-forming web are mutually compatible with any of these materials when used as a blending material in the sealant layer of the forming web described previously. For example, a non-forming web with an EVA sealant maY be used in connection with a sealant layer of EVA and the polybutene/polypropylene blend of a forming web to produce a peelable package. In addition, the same non-forming web may be used to form a peelable package in connection with a forming web having LLDPE or LDPE in the sealant layer. Thus, these three resins appearing in the forming or non-forming sealant layers are interchangeable, although some changes in performance may occur depending on the combination of sealants used.

In the case of the use of an ionomer as a blending material in the sealant layer of the forming web, it is necessary to use an ionomer as a sealing material in the corresponding non-forming web in order to provide a good peelable seal in the final package.

Another alternative is the use of the forming web as a non-forming web as well so that identical sealant materials will be bonded to each other in the final package. This is known as a uniweb construction.

Still another alternative is the use of the sealant blend described for the forming web in the non-forming web instead.

The easy-open mechanism according to the present invention works as follows. The product can be link sausage or other food products. A perimeter seal is formed at or near the periphery of the package at a certain range of temperatures. Subsequently, the first and second webs, during thermoforming or like process, are bonded at their contiguous surfaces in an area between the end of the enclosed product and the peripheral seal 20 and pull tab 22. This bonding occurs under substantially the same temperature conditions as for the perimeter seal, but under generally lower pressure and lower dwell times. Typically, the bonding occurs under atmospheric pressure.

Figure 4:
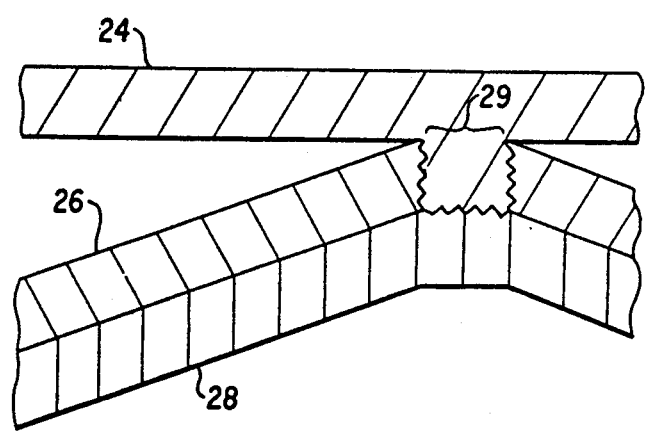
FIG. 4 is a schematic representation of the sealed area of the package in one embodiment of the invention.

Two mechanisms control the easy peelability of the resulting package (see FIGS. 4-5).

In the first mechanism, the sealant layers as described above are used for the first and second webs respectively. The interlayer adhesion between layers of the first web, and adhesion between layers of the second web, is designed to exceed the interweb adhesion between the respective sealant layers in the bonded and perimeter seal areas.

When the pull tab 22 is pulled apart by the end user, the package will easily peel apart along the seal interface between seal layer 24 of the first web, and seal layer 26 of the second web. Typical peel force required to open the package is less than 2.5 pounds per inch. The zigzag line of FIG. 4 shows the path of opening along the sealed area 27 (bonded area and perimeter seal) of the package.

It has been also found that when the pull tab 22 is pulled apart in this construction, a cohesive tear-out sometimes occurs in the bonded and perimeter seal areas of the package. This is graphically depicted in FIG. 5. The sealant layer 26 ruptures and the package is opened. The zigzag lines of FIG. 5 show the path of opening in the sealed area 29 of the package.

Both mechanisms typically occur at a peel force below 2.5 pounds per inch, and often below 1.5 pounds per inch. Compared with typical commercial easy-open packages having peel-open forces of 2.5 to 4 pounds per inch, a package made in accordance with the present invention is very easy to open.

The package in accordance with the present invention provides not only exceptional openability, but also good package integrity during storage, shipment, and display. The bonded area 18 of the package helps to insure that the package remains intact and hermetically sealed, and that the contained food product is adequately protected from exposure to the environment around the package.

One important attribute of the forming web in accordance with the present invention is that the interlaminar adhesive strength of the layers making up the non-forming web must be greater than the adhesive strength of the sealant layers of the first and second webs. This is necessary to limit the possible mechanisms for peeling to that described above, i.e. delamination of the sealant/tie interface of the forming web.

For convenience the second web may be referred to as a "non-forming" web, although in fact some forming of the web may be said to take place during a thermoforming or similar process.

A package is thus provided which includes a reliable easy-open feature in a shrinkable or non-shrinkable laminate package by utilizing controlled delamination of the sealing layer and an immediately adjacent layer in the forming web, and a sealant layer with sufficiently low strength to promote rupture of the layer.

Several forming and non-forming webs may be utilized in accordance with the present invention. Certain forming webs were used in combination with various non-forming webs to produce thermoformed packages.

The first or forming webs as described above are preferably produced by coextrusion, by means well known in the art.

The second or non-forming webs may be produced by lamination or by cast coextrusion.

The presence of an anti-block concentrate in the sealant layer of several embodiments of the forming and non-forming webs assures that wrinkling and tackiness of the sealant layer during extrusion and specifically during bubble collapse is substantiallY avoided. A secondary benefit in using small amounts of anti-block in the sealant layer is that the package flap 22 needed for peelable seals is easy to open.

Although in the preferred embodiments the blend of PB/PP and a third polymeric material is shown in the sealant layer of the forming web, and an ethylene polymer or copolymer is shown in the sealant layer of the second or non-forming web, these compositions can be reversed. Thus, the forming web could include a sealant layer of an ethylene polymer or copolymer and the non-forming web could include a sealant layer having the blend of PB/PP and a third polYmeric material. In this event, the sealant layer containing the EVA/EBC/PP blend would have an adjacent layer whose bond strength with the sealant material would provide the "tear-out" mechanism described above.

A package made in accordance with the present invention is especially suitable for the packaging of food products such as link sausage and smoked link sausage.

A major advantage and improvement of the present invention lies in the easy opening of packages made with the dissimilar sealants of the invention. In some cases peel strengths are considerably lower than those resulting from sealant combinations utilized in the past, but without significantly impairing package integrity.

The embodiment of the present invention in which linear low density polyethylene is blended with the polybutene/polypropylene blend is believed to be especially useful in packaging for microwave cooking applications.

While the above description has presented illustrative examples of the invention, those skilled in the art will readily perceive modifications to the invention after review of this description. Such modifications are well within the spirit and scope of the claims as defined below.

What is claimed is:

1. An easily opened package comprising:
   (a) a first web including a sealant layer comprising a blend of polybutene and polypropylene and a third polymeric material selected from the group consisting of:
      (i) ethylene vinyl acetate copolymer;
      (ii) low density polyethylene;
      (iii) linear low density polyethylene; and
      (iv) ionomer; and
   (b) a second web including a sealant layer consisting essentially of a polymeric material selected from the group consisting of ethylene vinyl acetate copolymer, low density polyethylene, linear low density polyethylene, ionomer, and mixtures thereof,
   (c) the first and second webs heat-sealed to each other and enclosing an article, and
   (d) and additional layer adjacent and bonded to the sealant layer of the first web, and comprising a polymeric adhesive.

2. An easily opened package comprising:
   (a) a first web comprising a core layer of ethylene vinyl alcohol copolymer, intermediate layers on each surface of the core layer comprising a polyamide, an outer layer of polypropylene, and a sealant layer comprising a blend of polybutene and polypropylene and a third polymeric material selected from the group consisting of:
      (i) ethylene vinyl acetate copolymer;
      (ii) low density polyethylene;
      (iii) linear low density polyethylene, and
      (iv) ionomer;
   said outer and sealant layers each bonded to a respective polyamide layer by means of an adhesive layer;
   (b) a second web comprising a sealant layer of a polymeric material selected from the group consisting of ethyylene vinyl acetate copolymer, low density polyethylene, and linear low density polyethylene; a layer adjacent the sealant layer comprising ethylene vinyl acetate copolymer; a print layer; an adhesive layer between the print layer and ethylene vinyl acetate copolymer layer, and an outer layer of biaxially oriented nylon; and
   (c) said first and second webs heat sealed to each other and enclosing an article.

3. A process for producing an easily opened package comprising:
   (a) forming a first web having a sealant layer comprising a polymeric material selected from the group consisting of ethylene vinyl acetate copolymer, low density polyethylene, linear low density polyethylene, and ionomer;
(b) placing the article on the first formed web;
c) disposing a second web having a sealant layer comprising a blend of polybutene and polypropylene, and a third polymeric material over the product to form an enclosure, the third polymeric material selected from the group consisting of;
  i) ethylene vinyl acetate copolymer,
  ii) low density polyethylene,
  iii) linear low density polyethylene, and
  iv) ionomer;
d) heating the second web;
e) vacuumizing the enclosure;
f) heat sealing the first and second webs at or near the periphery of the package; and
g) causing the heated second web to tack to the first web so as to enclose the article between the webs and bond the first and second webs to form a package.

4. A process for producing an easily opened package comprising:

a) forming a first web having a sealant layer comprising a blend of polybutene and polypropylene, and a third polymeric material selected from the group consisting of:
  i) ethylene vinyl acetate copolymer,
  ii) low density polyethylene,
  iii) linear low density polyethylene, and
  iv) ionomer;
b) placing the article on the first formed web;
c) disposing the second web having a sealant layer comprising polymeric material selected from the group consisting of ethylene vinyl acetate copolymer, low density polyethylene, linear low density polyethylene, and ionomer over the product to form an enclosure;
d) heating the second web;
e) vacuumizing the enclosure;
f) heat sealing the first and second webs at or near the periphery of the package; and
g) causing the heated second web to tack to the first web so as to enclose the article between the webs and bond the first and second webs to form a package.

* * * * *